US009809185B2

(12) United States Patent
Visintainer et al.

(10) Patent No.: US 9,809,185 B2
(45) Date of Patent: Nov. 7, 2017

(54) METHOD AND APPARATUS FOR SUBJECTIVE COMMAND CONTROL OF VEHICLE SYSTEMS

(75) Inventors: Randal Henry Visintainer, Ann Arbor, MI (US); Krishnaswamy Venkatesh Prasad, Ann Arbor, MI (US); Dimitar Petrov Filev, Novi, MI (US); Oleg Yurievitch Gusikhin, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 755 days.

(21) Appl. No.: 13/602,493

(22) Filed: Sep. 4, 2012

(65) Prior Publication Data
US 2014/0067201 A1   Mar. 6, 2014

(51) Int. Cl.
| B60R 16/00 | (2006.01) |
| B60R 16/037 | (2006.01) |
| G10L 15/22 | (2006.01) |

(52) U.S. Cl.
CPC .... B60R 16/0373 (2013.01); *G10L 2015/223* (2013.01)

(58) Field of Classification Search
None
See application file for complete search history.

(56) References Cited

U.S. PATENT DOCUMENTS

| 5,027,406 A | 6/1991 | Roberts et al. |
| 5,852,804 A * | 12/1998 | Sako .............................. 704/275 |
| 6,658,389 B1 | 12/2003 | Alpdemir |
| 7,663,471 B2 | 2/2010 | Nakashima et al. |
| 7,949,529 B2 | 5/2011 | Weider et al. |
| 2001/0047261 A1 | 11/2001 | Kassan |
| 2004/0185842 A1 | 9/2004 | Spaur et al. |
| 2004/0220798 A1 * | 11/2004 | Chi et al. ....................... 704/201 |
| 2008/0073057 A1 * | 3/2008 | Kojima et al. .................. 165/43 |
| 2009/0150024 A1 * | 6/2009 | Kojima et al. .................. 701/36 |

(Continued)

FOREIGN PATENT DOCUMENTS

| CN | 101093588 A | 12/2007 |
| CN | 101452259 A | 6/2009 |
| CN | 102204233 A | 9/2011 |

OTHER PUBLICATIONS

Chinese Patent Office, First Office Action for the corresponding Chinese Patent Application No. 201310398003.0, dated Aug. 14, 2017.

*Primary Examiner* — Angela Ortiz
*Assistant Examiner* — Garrett Evans
(74) *Attorney, Agent, or Firm* — Jennifer Stec; Brooks Kushman P.C.

(57) ABSTRACT

A system includes a processor in communication with at least one input, and configured to control at least one vehicle system. The processor is further configured to receive a command including a subjective element. The processor is also configured to access a mapping associated with a user from whom the command originated to retrieve a user-specific meaning, the mapping defining user-specific meanings for at least one subjective element. Further, the processor is configured to apply a user-specific meaning to an implementation of the command, such that a vehicle system is adjusted in accordance with both the subjective element and the user-specific meaning associated therewith.

15 Claims, 5 Drawing Sheets

(56) References Cited

U.S. PATENT DOCUMENTS

| | | |
|---|---|---|
| 2010/0097178 A1 | 4/2010 | Pisz et al. |
| 2010/0185445 A1* | 7/2010 | Comerford et al. .......... 704/251 |
| 2011/0055186 A1 | 3/2011 | Gopalakrishnan |
| 2011/0131045 A1 | 6/2011 | Cristo et al. |

* cited by examiner

METHOD AND APPARATUS FOR SUBJECTIVE COMMAND CONTROL OF VEHICLE SYSTEMS

TECHNICAL FIELD

The illustrative embodiments generally relate to a method and apparatus for subjective command control of vehicle systems.

BACKGROUND

Voice actuated computing systems are gradually making their way into modern life. Initially, these systems were often found in telephone menu paradigms, but it has been increasingly common so see voice actuation of other systems, and the format particularly makes sense in areas where a person cannot interact with a keyboard. One such area is that of control of automotive computing systems, such as, but not limited to, infotainment systems.

One complaint users of such systems may have, is that the systems typically do not respond well to "conversational" dialogue. A four year old may understand a conversational sentence better than a computing system that cost millions of dollars to develop. This is because these systems often operate off of keywords, and further because the systems often have little to no sense of context. People, on the other hand, may prefer to speak in subjective terms, as opposed to dialogue consisting of a string of spoken, often objective, commands (e.g., without limitation "set volume to level 3"). Instead of an explicit volume level, a vehicle occupant may prefer, for example, to say "turn up the volume slightly." "Slightly," however, is a subjective command, having different meaning for different people. It also may mean different things to the same person, depending on a current volume setting.

Attempts have been made to get voice-commanded systems to understand subjective and conversational dialogue, but plenty of room for improvement remains in this area.

U.S. Pat. No. 7,949,529, generally discusses a mobile system that includes speech-based and non-speech-based interfaces for telematics applications. The mobile system identifies and uses context, prior information, domain knowledge, and user specific profile data to achieve a natural environment for users that submit requests and/or commands in multiple domains. The invention creates, stores and uses extensive personal profile information for each user, thereby improving the reliability of determining the context and presenting the expected results for a particular question or command. The invention may organize domain specific behavior and information into agents, that are distributable or updateable over a wide area network.

U.S. Patent Publication 2011/0131045 discusses systems and methods for receiving speech and non-speech communications of natural language questions and/or commands, transcribing the speech and non-speech communications to textual messages, and executing the questions and/or commands. The application applies context, prior information, domain knowledge, and user specific profile data to achieve a natural environment for one or more users presenting questions or commands across multiple domains. The systems and methods create, store and use extensive personal profile information for each user, thereby improving the reliability of determining the context of the speech and non-speech communications and presenting the expected results for a particular question or command.

U.S. Patent Publication 2011/0055186 discusses a method and system for personalizing information retrieval in a communication network. The method comprising receiving one or more inputs from a plurality of sources, processing information present in the one or more inputs received from the plurality of sources, performing a contextual and personalized search based on the inputs received and displaying one or more results in support of the information in the communication network. The system herein comprising an application server for receiving one or more inputs from a plurality of sources, a processor for performing at least one of processing an information present in the inputs received from the plurality of sources, generating one or more virtual documents based on the processing of the information present in the one or more inputs, performing a search based on the virtual documents generated and a display unit for displaying one or more results.

SUMMARY

In a first illustrative embodiment, a system includes a processor in communication with at least one input, and configured to control at least one vehicle system. The processor is further configured to receive a command including a subjective element. The processor is also configured to access a mapping associated with a user from whom the command originated to retrieve a user-specific meaning, the mapping defining user-specific meanings for at least one subjective element. Further, the processor is configured to apply a user-specific meaning to an implementation of the command, such that a vehicle system is adjusted in accordance with both the subjective element and the user-specific meaning associated therewith.

In a second illustrative embodiment, a system includes a processor in communication with at least one input, and configured to control at least one vehicle system. The processor is configured to adjust the vehicle system in accordance with a command including at least one subjective element, the adjustment being based at least in part on a user-specific profile defining a meaning for the subjective element and an objective portion of the command.

In a third illustrative embodiment, a tangible computer-readable storage medium, stores instructions that, when executed by a processor, cause the processor to perform the method including receiving a command including a subjective element. The method also includes accessing a user-associated mapping, defining a user-specific meaning for the subjective element. Also, the method includes applying the user-specific meaning to an implementation of the command to adjust a vehicle system in accordance with both the subjective element and the user-specific meaning associated therewith.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
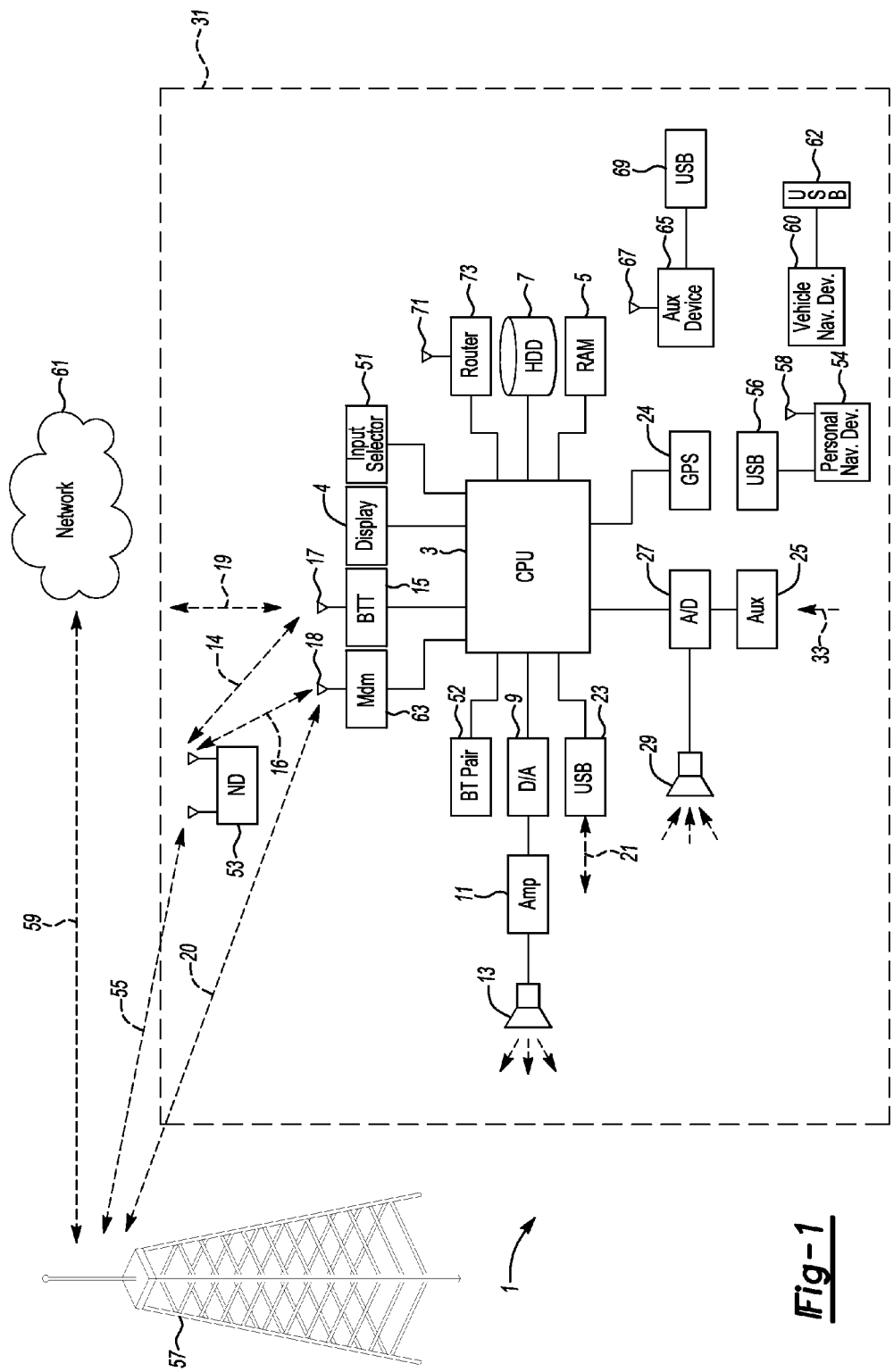
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users.

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
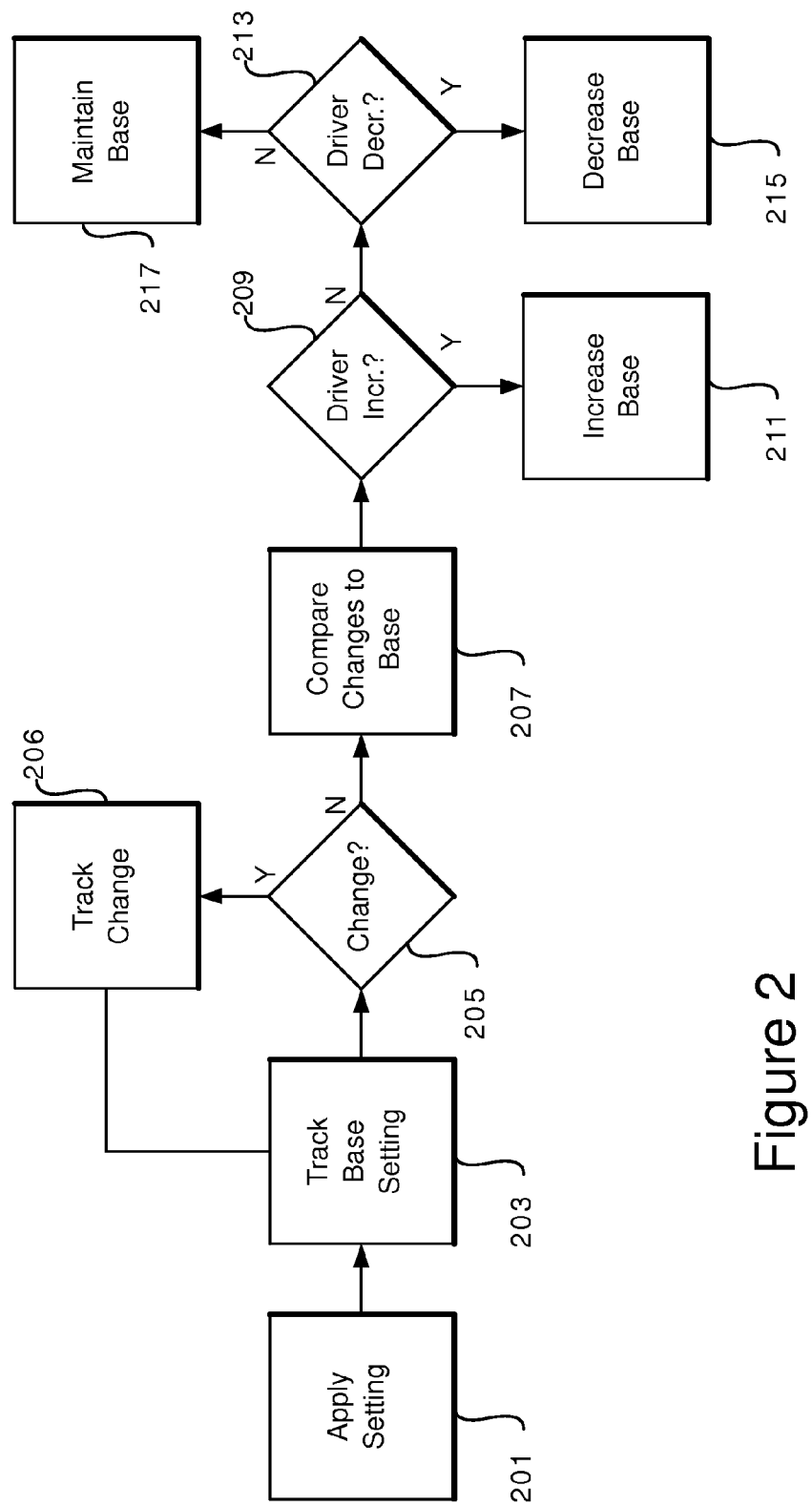
FIG. 2 shows an illustrative example of a subjective command learning process.

FIG. 2 shows an illustrative example of a subjective command learning process. This is one example of how a system can gradually learn user preferences associated with various subjective commands. These subjective commands can be used to modify a variety of vehicle settings, including, but not limited to, seat pressure, HVAC, radio controls, display brightness and any other system that has a range of settings. Subjective commands can also be used to control binary systems, but in this sense the commands are subjective because they give uncommon meaning to words (e.g. "hit the lights"). In the binary instances, the system needs to learn that "hit" means "turn on," as opposed to apply long term learning to see to what degree a system should be adjusted based on a command.

| Auto (k) High | $F_{11}$ | $F_{12}$ | $F_{13}$ |
| Auto (k) Medium | $F_{21}$ | $F_{22}$ | $F_{23}$ |
| Auto (k) Low | $F_{31}$ | $F_{32}$ | $F_{33}$ |
| | Manual (k + 1) High | Manual (k + 1) Medium | Manual (k + 1) Low |

In the table illustrated above, the individual rows represent automatically selected settings made at time (k) and the columns represent manual adjustments made at time (k+1). Each element then represents how a driver responds following an automatic setting, and can be used to track a preferred state. For example, if a system initially set a state to a high value, and the driver adjusted the state significantly downward, $F_{13}$ may be incremented, indicating that when a value was set to a high state, the driver decreased the value. Utilizing this information, the following equations can be used to determine preferred settings and refine a system's understanding of driver preferences:

$$F_{ij}(k) = F_{ij}(k-1) + \varphi(f(k) - F_{ij}(k-1))$$

$$f(k) = \begin{cases} 1 \text{ if } ManualSelection\ (k+1) \equiv AutoSelection(k) \\ 0 \text{ otherwise} \end{cases}$$

$$F_{ij}(k) \geq 0$$

$$\varphi \approx 0.95$$

The above can provide a statistical analysis of changes implemented by a driver, which can then be used to update initial set points using the following algorithm:

If $L > H$ or $Z$ Then $S(k)=S(k-1)+\Delta$

If $L < H$ or $Z$ Then $S(k)=S(k-1)-\Delta$

If $Z > L$ or $H$ Then $S(k)=S(k-1)+\Delta$

In the preceding equations, L is the number of times a user has downwardly adjusted an automatic setting, Z is the number of times the user has accepted the automatic setting, and H is the number of times the user has upwardly adjusted the automatic setting.

In the process shown in FIG. 2, an initial setting is first applied (or adjusted automatically) on the basis of a received subjective command 201. This setting can correspond, for example, to a previously identified setting or to a "guessed" setting, in the case of a new subjective mapping. The base setting is tracked 203, and the system then observes if changes are made to the base setting/adjustment 205.

If a change is made, the process can also track the change 207, to determine how the current base setting should be adjusted, as shown in the equations above. The number of incremental, decremental and unchanged instances can be observed and compared 208. If the majority of instances were increases 209, the process can then reset the base setting to a higher setting 211. Over time, as this setting gradually increases, the process may discover that the new base setting is too high. If that is true, then the system may see a greater number of decreases than increases 213 and the system can respond by decreasing the base setting 215. Once the number of "non-events" is greater than increases or decreases, the process can simply maintain the base setting as the acceptable setting 217.

Since a non-event is exactly that, the "unchanging" of a setting, it may be useful to measure "non-events" based on some period of time passage without setting adjustment. For example, for each minute following a setting change that results in no change, a non-event may be registered. This measurement may continue for a suitable amount of time to establish that the setting is the correct one, but may not continue indefinitely, so as not to significantly outweigh instances of change.

Figure 3:
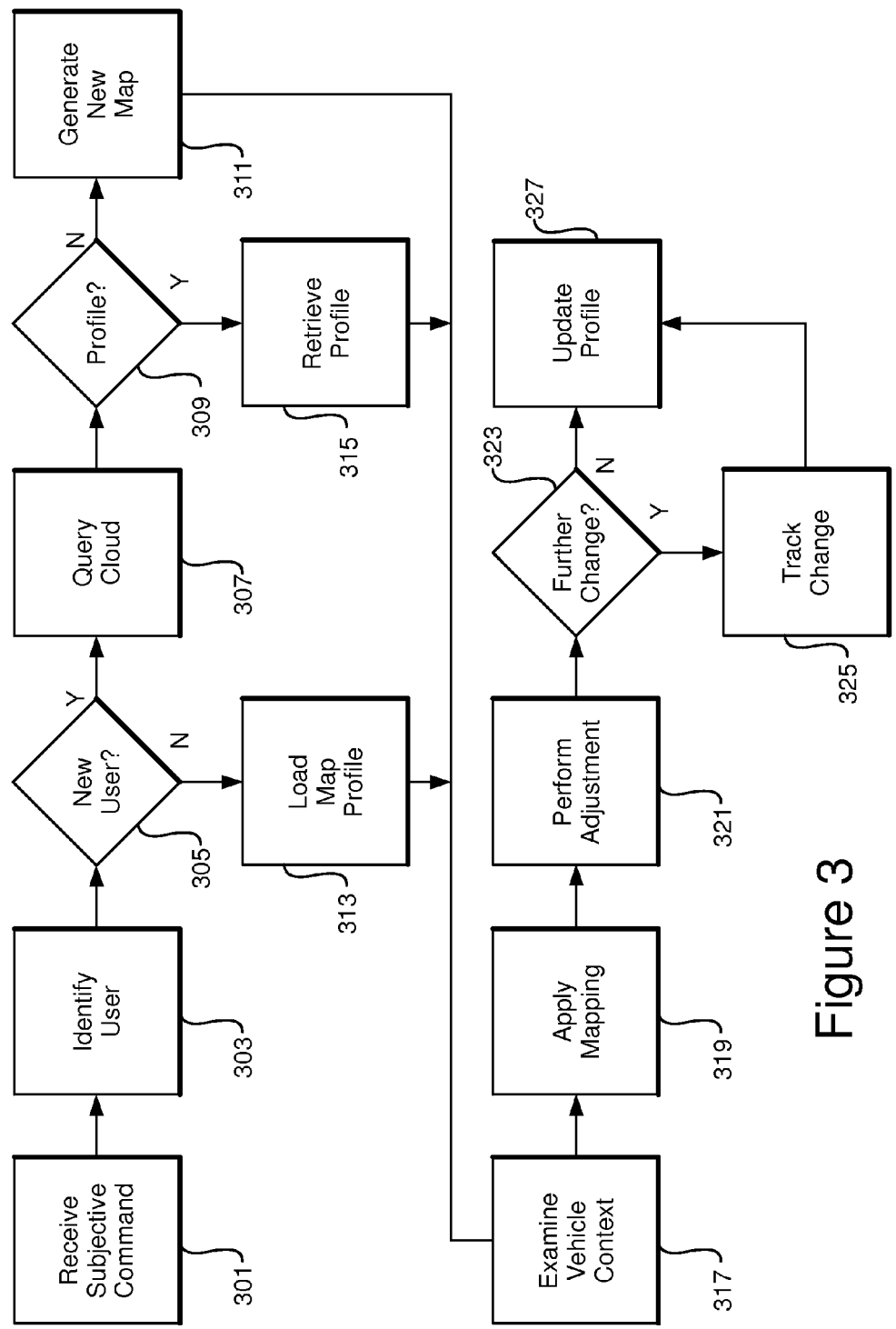
FIG. 3 shows an illustrative example of a subjective command processing process.

FIG. 3 shows an illustrative example of a subjective command processing process. In this illustrative example, a user may speak a subjective command to control any of a variety of computing-related onboard systems. These can include, but are not limited to, stereo controls, HVAC controls, vehicle windows, vehicle seats, any number of infotainment functions, etc.

In this example, the user may or may not have previously identified a particular system that the control relates to, or, alternatively, a command may include one or more words that identifies the system (e.g., without limitation, "move driver's seat up a little," "slightly increase the temperature," etc.). Once the process has received the subjective command 301, the process may attempt to identify the user 303. This process can be done by, for example, voice recognition, device recognition (e.g., there is only a single passenger and a single paired phone), facial recognition or any other suitable process.

If the user is a new user 305, the process may query the cloud 307 to see if a profile for this user has been developed on another vehicle 309. For example, if the current vehicle is a rental car, equipped with the process, the driver may have already established subjective command mapping in a personal vehicle. This information may be stored in the cloud so that the user's profile can be accessed on a different device.

If a profile does not exist in remote storage (or local storage), the process may generate a new subjective mapping for that user 311. This mapping will be stored as a user profile, either locally, remotely or both, and can be used to interpret future commands by the user. The profile can also be adjusted based on observed user preferences, so that the user's desires are more accurately reflected when subjective commands are spoken.

Numerous techniques can be used to identify a user who is speaking. For example, voice recognition software could be employed, or vehicle cameras or other biometric devices could learn information about a user. In another example, the user could explicitly identify themselves for the system. One common function for identifying a user can be performed using the driver's device. The device could either store a user profile thereon, to be transferred to a vehicle computing system, or the device could have an identifier, such as an ESN, which could be used to retrieve a profile (perhaps stored on the cloud) associated therewith. These are exemplary non-limiting means of identifying a speaker/occupant/driver, and are not intended to limit the scope of the invention in any manner.

If the user has a local profile stored on the vehicle, either from the current journey or because one or more profiles are locally stored, the process, after identifying the user 305, can load a local mapping profile 315.

The mapping profile shows how a user prefers settings to be implemented, and also what meaning (in, for example, a relative sense) the system should give to subjective commands. As seen in FIG. 2, the mapping profile can be updated over time to reflect a user's preferences, so that it provides more accurate response to subjectively input commands.

It's also possible that a driver's commands or preferences may have different meanings based on current context. With regards to initial settings of, for example, a heater or AC, the system may select a different base setting depending on current determined temperature/weather conditions. Also, driver subjective commands may have different meanings in varied context. For example, once a cabin interior has reached a certain high temperature, a driver request to diminish the heat may mean something different than if the driver requests the same at a lower cabin temperature. By observing manual changes made by a driver after subjective commands can be interpreted, it can be learned what a driver's subjective commands mean under a variety of contexts.

In this example, the process may examine the vehicle context before proceeding with mapping application 317. For example, time of day, temperature, weather, driving conditions, various vehicle system states, and numerous other aspects of context can be considered. It is also possible that, in some implementations, context is not considered and the system operates such that a present interpretation of a subjective command is considered in a more static fashion, that is, without regard to a current vehicle state. In this case, the learned information relating to driver meaning can still be applied to produce increasingly accurate results over time.

Once, in this example, context has been considered and it is know what "version" of a subjective command mapping should be used, the mapping can be applied 319 based on known information (or guessed information, in the case of a new mapping). The appropriate mapping, in conjunction with, for example, keywords in a command, can be used to perform an adjustment to a vehicle system 321. For example, a command to "turn up the volume" has the subjective portion "turn up" and the keyword "volume" included therein.

The word "volume" indicates to the system that the user is interested in changing the audio output of the vehicle's sound system. The words "turn up" indicate that an increase in volume is desired. While this command could be viewed as an objective command, always resulting in a static increase in the volume level, it may require the user to repeat the command numerous times before the desired volume is reached. In a subjective sense, the process may know that a user prefers a certain volume level, and, if that level is not present, the process may make a larger move towards that level. Or the process may move directly to the preferred level, and then determine if any manual adjustments are made indicating that a slightly different level is preferred.

For example, if the command is applied and a certain volume level is achieved, the process may then determine if any future changes are made to the level 323. If there are any changes made, the process can track those changes 327 and use the changes to update the mapping profile 325. A lack of changes can also be used to update a profile, such that the system "observes" that a selected level was correctly chosen as the most desirable level.

This is another example where context could be applicable to give further meaning to subjective commands. For example, if the weather is nice and a user is driving along leisurely with the windows down, the user may be someone who likes the stereo turned up significantly in this situation. By recognizing the speed, weather and window states, the process may determine that the user wants the stereo at or near a maximum level when the command "turn up the volume" is issued. Similarly, if a vehicle microphone detects that there is ongoing conversation in a vehicle, the system may recognize that a command to "turn down the volume" means to set the stereo at a low volume so that conversation can be heard.

If, on the other hand, a user typically listens to the stereo at a certain volume on a drive home from work, an observation of, for example, the time of day, day of week and/or a route destination can show that the user is headed home from work. In this case, a command to turn up or turn down the volume can be an indication to set the stereo at a preferred volume for that time of day.

Since the system learns over time, the user does not necessarily need to input a preferred preference in advance, or fixedly set a system to respond in a certain manner to commands given in different scenarios. The system will instead observe behavior and provide output coincident with the most commonly observed preferences in varied circumstances.

In at least one implementation, new subjective commands can also be learned by the system. For example, in one area of the country, people may say "crank the volume" to mean "turn the volume up to a large degree." In another area of the country, people may say "bump the volume" or "blast the volume." Since it could be difficult to include "crank," "bump," "blast" and any other number of commands, if a command string is received where the subjective command is unrecognized, the system may record that portion of the string as a new command, with the user input behavior following the request corresponding to meaning.

For example, if the person said "crank the volume" and then turned the volume way up, the system would know that "crank" means increase greatly, maximize or some similar scenario. At a later point, if the same user said "crank the air conditioning," then the system could know that the user wanted the air conditioning increased significantly or maximized (based on observed behavior). "Crank" may also have different meaning relating to volume and HVAC systems, and may further vary in meaning based on observed context. This is just one example of how new subjective commands can be learned by a system to further customize the user experience.

Figure 4:
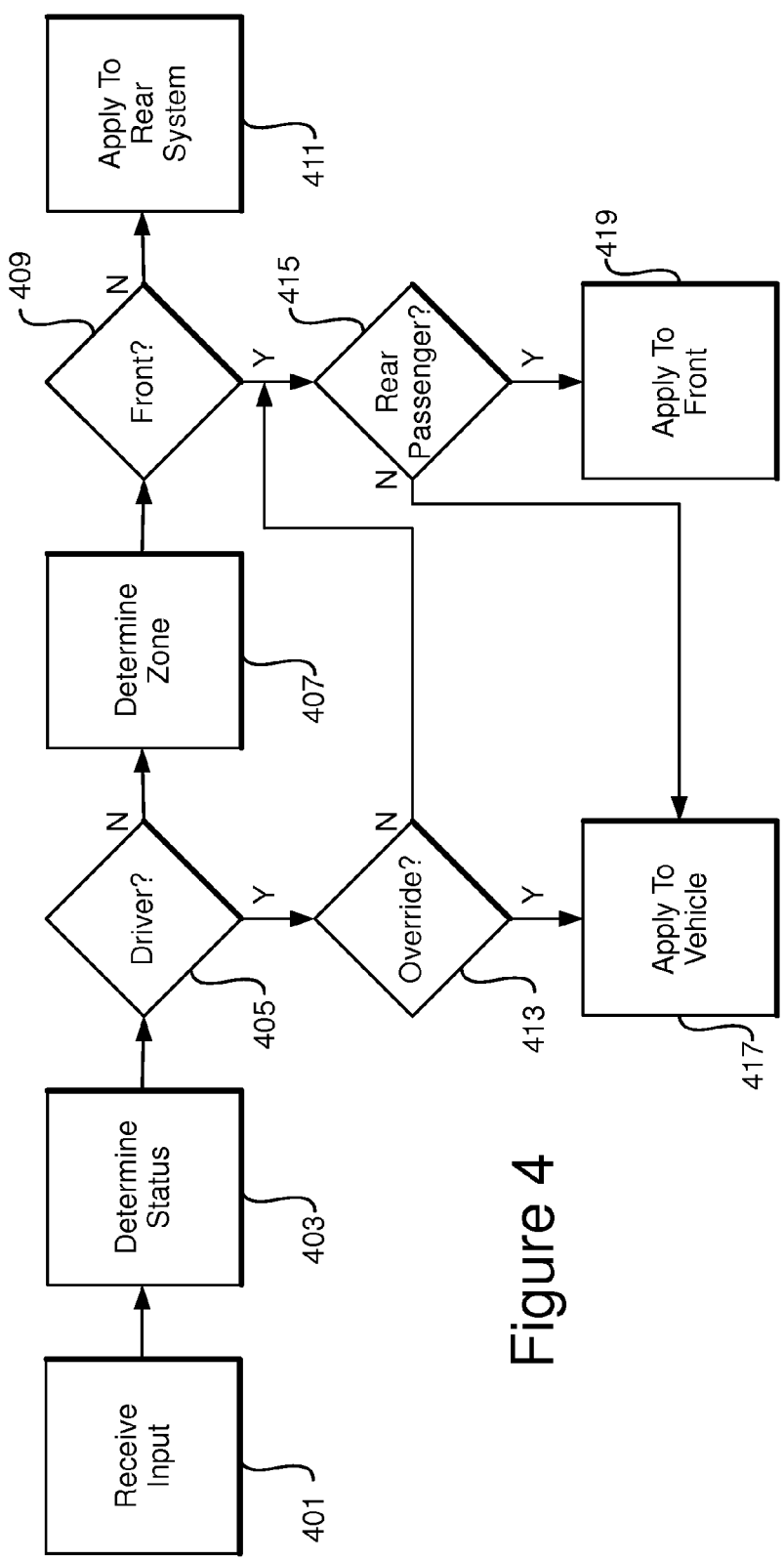
FIG. 4 shows an illustrative example of a zone-command processing process.

FIG. 4 shows an illustrative example of a zone-command processing process. In this illustrative example, subjective commands may be processed on a zone-by-zone basis. For example, volume or HVAC controls may have vehicle zones associated therewith (e.g., driver, passenger, rear seat, etc.). Since different vehicle occupants may have different preferences, it may be the case that a command should only be applied to a particular zone in a vehicle. For example, if children in the back seat want a volume adjustment, it may only be appropriate to apply the adjustment to a rear seat speaker.

In this illustrative example, the process receives input from a vehicle occupant 401. First, the system may determine the status of the command giver 403. For example, if the command comes from the driver 405, then there is a chance that the driver's command should override all zones of a vehicle. Override may be more useful for, for example, sound settings which can affect the whole vehicle than, for example, personal climate control settings which impact the whole vehicle more slowly.

If the driver's command is designated as an override command 413, or if, for example, there is only one occupant (the driver), then the system can apply the input to the whole vehicle 417.

Determining where a command comes from can be achieved in a variety of ways. Microphones located in different zones can assist in this, as well as seat sensors to know if certain zones even have any occupants therein at all. Cameras and other means of detecting passenger presence and vocal instruction can also be employed to determine where commands are coming from.

Figure 5:
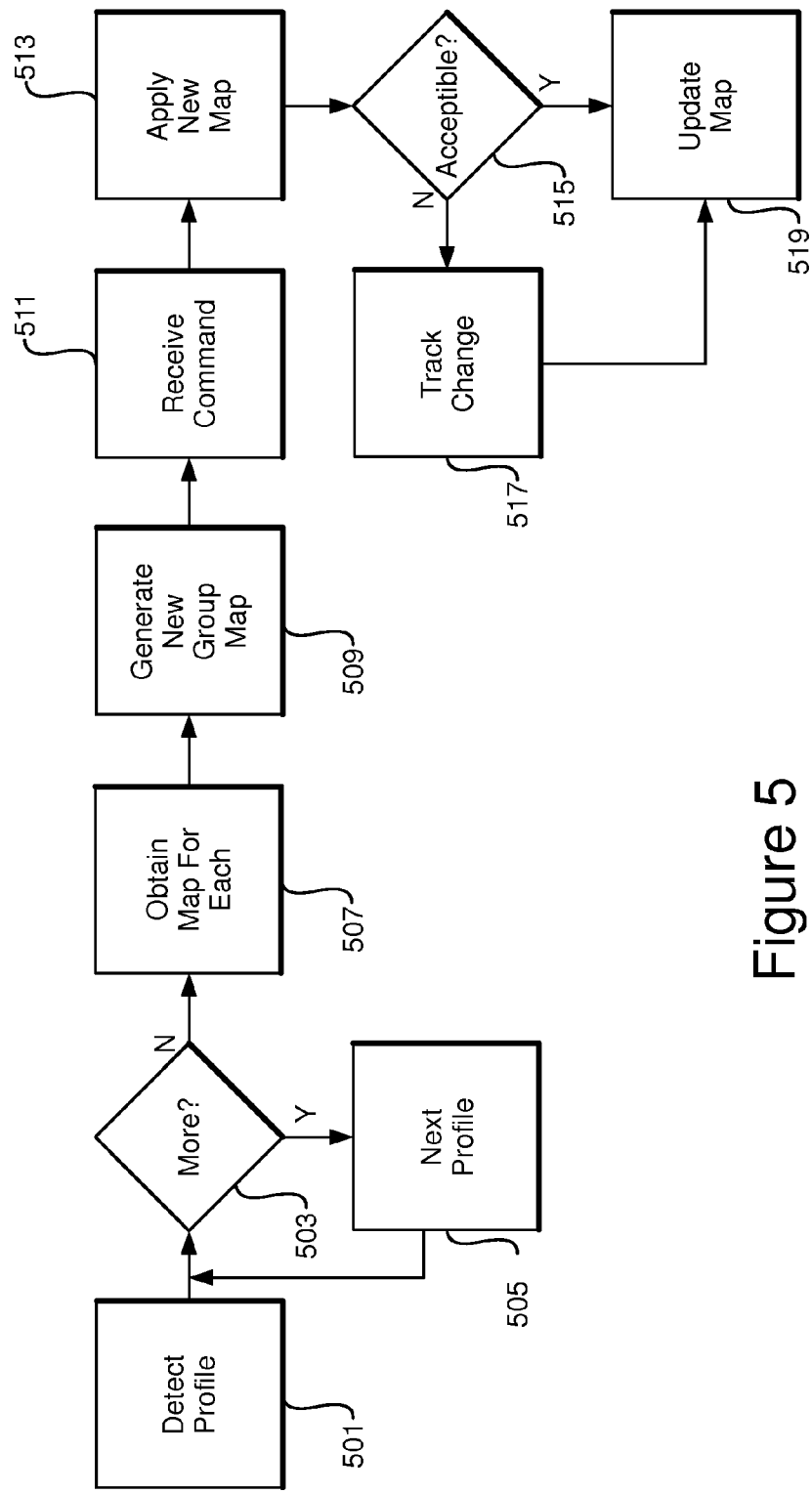
FIG. 5 shows an illustrative example of a group command processing process.

FIG. 5 shows an illustrative example of a group command processing process. In this illustrative example, consideration is given to a group of passengers traveling in the same vehicle. Subjective mappings can be obtained, for example, for a number of people traveling in a group. Group preferences can be determined and members of a group can be identified based on associated wireless devices, facial/vocal recognition, or any other suitable means.

In this illustrative example, the process attempts to determine if a profile exists 501 for at least one of the group members. The process will then attempt to retrieve or create profiles 503, 505 for each of the group members, until all group members have been addressed. Mappings 507 are then obtained for each of the group members (or generated, if new profiles without existing mappings have been created).

Based on existing/new mappings, a group mapping is generated 509. This can be adjusted based on the preferences of the group as a whole. Adjustments made to controls while the group is present can be mapped to the group profile. A command can be received 511 and a current mapping can be applied 513. If the implementation of the command (e.g., "slightly adjust heat" increases the heat by 2 degrees) is acceptable 515, the process can update the map 519. If the command requires tweaking, any changes can be tracked 517 and the group map can then be updated. In this manner, suitable mappings for subjective commands can be obtained.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
control a vehicle system;
receive a command including a subjective element;
retrieve a user-specific meaning for the subjective element from a user-associated mapping;
implement the command based on the user-specific meaning, such that the vehicle system is adjusted in accordance with the user-specific meaning;
detect a user-implemented manual change to the vehicle system, following adjustment based on the command; and
update the mapping based on the manual change.

2. The system of claim 1, wherein the vehicle system is an HVAC system.

3. The system of claim 1, wherein the vehicle system is a sound system.

4. The system of claim 1, wherein the processor is further configured to access the mapping by retrieving the mapping from a remote source.

5. The system of claim 1, wherein the processor is further configured to upload the updated mapping to a remote source.

6. The system of claim 1, wherein the processor is configured to detect manual changes and update the mapping for only a predefined period of time following adjustment based on the subjective element.

7. A system comprising:
a processor configured to:
control a vehicle system;
adjust the vehicle system in accordance with a command including a subjective element, the adjustment based on a user-specific meaning for the subjective element defined in a user-profile and an objective portion of the command;

detect a user-implemented manual change to the vehicle system, following adjustment based on command; and modify a meaning for the subjective element based on the manual change.

8. The system of claim 7, wherein the objective portion denotes an explicit increase or decrease in a system setting and the subjective element denotes an abstract instruction to increase or decrease the setting.

9. The system of claim 8, wherein the processor is configured to apply the abstract instruction to increase or decrease the setting based on at least one instance of previously observed behavior in accordance with an application of the subjective command referring to the same abstract instruction to increase or decrease the setting, the at least one instance of previously observed behavior having been saved in the user-specific profile.

10. The system of claim 9, wherein the at least one instance of previously observed behavior includes a manual adjustment of the vehicle system following an automatic adjustment of the system responsive to the subjective command.

11. The system of claim 10, wherein the manual adjustment is factored into the user-specific meaning for the subjective element, such that a processor retrieved meaning of the subjective element reflects at least some portion of the manual adjustment.

12. A non-transitory computer-readable storage medium, storing instructions that, when executed by a processor, cause the processor to perform the method comprising:

receiving a command including a subjective element;

accessing a user-associated mapping, defining a user-specific meaning for the subjective element;

adjusting a vehicle system in accordance with the user-specific meaning;

detecting a user-implemented manual change to the vehicle system, following adjustment based on the command; and modifying a meaning for the subjective element based on the manual change.

13. The computer readable storage medium of claim 12, wherein the vehicle system is an HVAC system.

14. The computer readable storage medium of claim 12, wherein the vehicle system is a sound system.

15. The computer readable storage medium of claim 12, wherein the processor is further configured to retrieve the mapping from a remote source.

* * * * *